O. CARON.
ANIMAL POKE.
APPLICATION FILED JAN. 22, 1915.
1,203,701.
Patented Nov. 7, 1916.
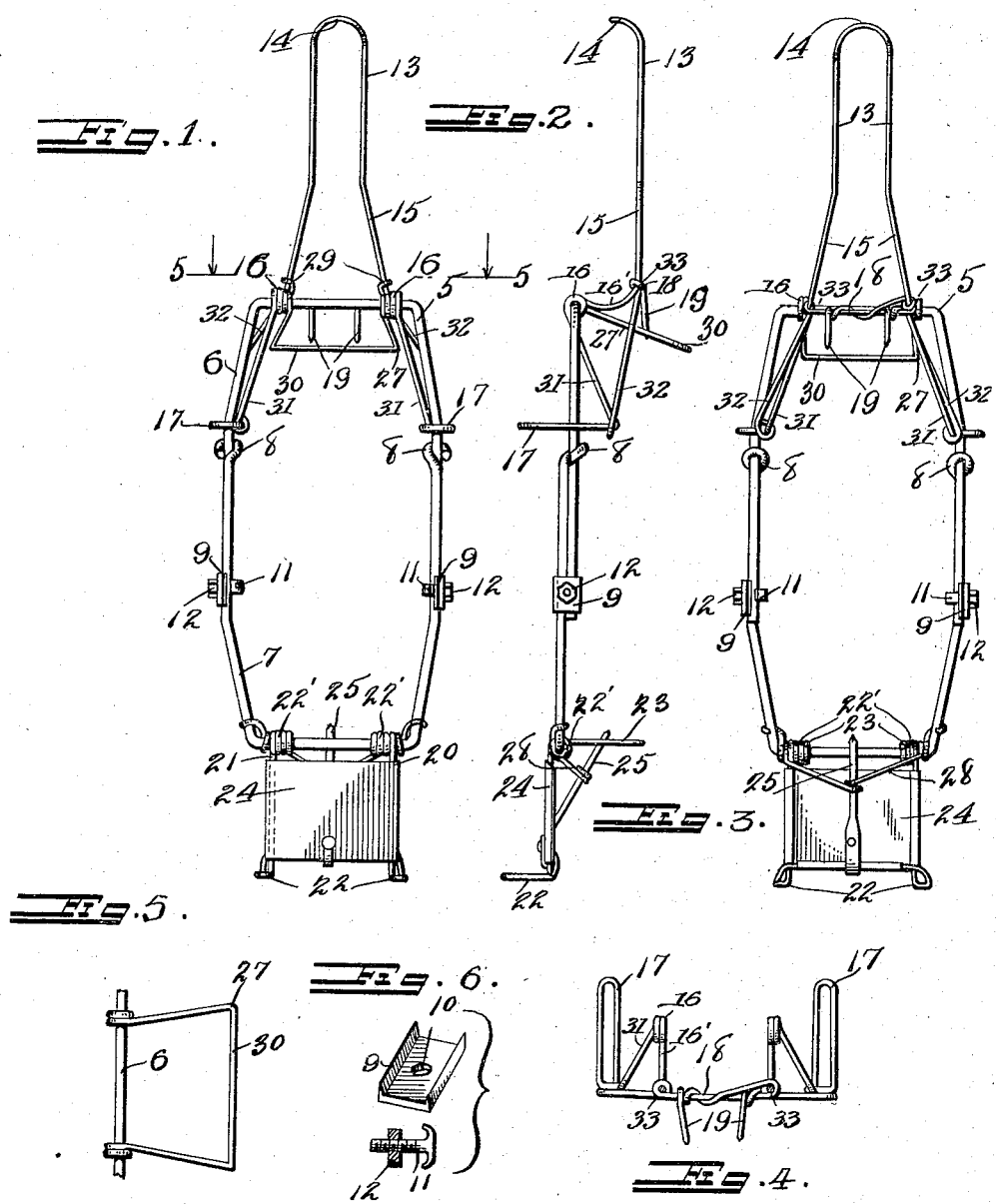

UNITED STATES PATENT OFFICE.

OCTAVE CARON, OF SCRANTON, NORTH DAKOTA, ASSIGNOR OF ONE-FOURTH TO ERNEST W. CHRISTOPHER, OF SCRANTON, NORTH DAKOTA.

ANIMAL-POKE.

1,203,701.         Specification of Letters Patent.        Patented Nov. 7, 1916.

Application filed January 22, 1915. Serial No. 3,795.

*To all whom it may concern:*

Be it known that I, OCTAVE CARON, a citizen of the United States, residing at Scranton, in the county of Bowman and State of North Dakota, have invented certain new and useful Improvements in Animal-Pokes, of which the following is a specification.

This invention relates to animal pokes, and is especially adapted for use on cows, the primary object being to prevent the cow from going through fences, and reducing possibility of her jumping over fences to a minimum.

Another object of the invention is to provide an adjustable frame adapted for use on animals of various sizes, and being readily removable from the animal when desired.

A further object is to provide a simple device which may be very cheaply manufactured, at the same time, being efficient in its operation, and durable to withstand strain which may be exerted thereon.

Other objects as well as the nature, characteristic features and scope of my invention will be more readily understood from the following description taken in connection with the accompanying drawings and pointed out in the claims forming a part of this specification.

Referring to the drawings: Figure 1 is a front elevational view of the device, Fig. 2 is a side elevational view of the same, showing the upper abutment thereof flexed slightly rearwardly, Fig. 3 is a rear elevation of the invention, Fig. 4 is a cross sectional view taken on the line 5—5 of Fig. 1, Fig. 5 is a plan view of the guard member, and Fig. 6 is a perspective view of the clamping plate and side elevational view partly in section, respectively of the means by which the component sections of the frame are held in a predetermined position.

In the drawings wherein is illustrated the preferred embodiment of this invention, the portion which I shall hereinafter refer to as the frame is generally designated 5, and is shown to be of a substantially oblong configuration, comprising a pair of members 6 and 7, being the upper and lower sections, respectively, which are formed from suitable rigid wire strands or the like. The free terminals of the lower section 7 are formed to provide looped eyes 8, which are slidably engaged with the opposite ends of the upper section 6. The sections are held in a predetermined adjusted position by clamping plates 9, one of which is arranged on each side of the frame, being of an elongated configuration and of a U-shaped configuration in cross section. Each of the plates is provided with a central opening 10, which is adapted to receive the shank of a bolt 11, the latter being of a T-shaped configuration and the head of the T curved to conform to the ends of the wire sections 6 and 7. A nut 12 is threaded on the bolt 11 in the usual manner, so as to hold the plate 9 in a predetermined position upon the frame, whereby the sections are held in a predetermined position.

Associated with the upper section 6 is a lever 13 which is formed from a single strand of wire and which has an intermediate portion thereof bent into a substantially U-shaped configuration, the vertex of the U being bent forward as indicated at 14 to prevent slipping of the fence wires or the like therefrom, while the lower ends of the arms of the U are diverged as indicated at 15 and shown to advantage in Figs. 2 and 4, the lower ends of the diverging portion being curved as at 16′ and then coiled about the upper end of the section 6, as at 16, thereby positioning the lever 13 out of vertical alinement with the frame 5, as shown to advantage in Fig. 3. The opposite ends of the wire strand after having been coiled about the section 6 are extended downwardly for an appreciable distance as at 31, in proximity to the section 6 after which they are formed to provide elongated loops 17 which embrace the opposite sides of the section 6, the loops 17 being slidably engaged with said section 6 so as to permit movement of the lever 13 in a horizontal plane. The opposite ends of the strand of wire after having been bent to form the loops 17, are extended upwardly as at 32, one of which is engaged about the lower ends of the divergent portions 15 of the lever 13 at 33, as illustrated to advantage in Fig. 5, after which both are entwined, as at 18, while the extreme ends of the strands are projected downwardly and pointed to provide prick-points 19, which engage the animal when pressure is exerted upon the lever 13.

A lever generally designated 20 is associated with the lower end of the section 7 and comprises a single strand of wire, an intermediate portion of which is formed to provide a substantial parallelogram 21, having feet 22 extending therefrom, while the opposite ends of said strand are coiled about the lower end of the section 7 as indicated at 22′, the free terminals of said ends being pointed and extended outwardly from the frame 7 to provide prick-points 23 which are adapted to engage the animal when pressure is exerted on the lever 20. A plate 24 preferably made of tin is mounted upon the parallelogram 21, the opposite ends of said plate 24 being rolled about the opposite sides of the parallelogram, while the lower margin of said plate is rolled about the base of the parallelogram, as illustrated to advantage in Fig. 3. A finger 25 is fixedly engaged with the plate 24, having the free end thereof reduced and extended outwardly from the plate, the extreme end terminal of said finger being pointed to engage the animal when pressure is exerted on the lever 20.

In order to prevent the animal-engaging-points, which are used for inflicting injury upon animals when pressure is exerted upon the levers 13 and 20 from penetrating the animal by the vibration of the latter's body during locomotion, suitable resilient means are associated with each of the levers and are designated 27 and 28, which are associated with the upper and lower abutments, respectively. The resilient means 27 which is associated with the upper lever comprises a strand of resilient wire, the opposite ends of which are engaged with the arms of the latter, as indicated at 29, while intermediate portions of said strand are coiled about the section 6 in close proximity to the convolution 16, while a portion midway the ends of the strand is bent at substantially right angles to the body to provide a guard 30, in order to prevent the prick-points 19 from normally engaging the animal. By this formation, it is seen that pressure is normally exerted upon the lever 13 by the elastic means 27, so as to hold the lever forwardly, permitting it to be freely bent rearwardly when pressure is exerted thereon, so as to penetrate the prick-points 19 into the body of the animal upon which the poke is engaged. The elastic means 28, likewise comprises a strand of resilient wire, an intermediate portion of which is coiled about the reduced end of the finger 25, while the opposite ends thereof are coiled about the lower end of the section 7, and the free terminal engaged with the sides of the latter, thereby normally exerting pressure upon the lever 20, so as to press the same forwardly to normally retain the prick-points 19 and the point of the finger 25 out of engagement with the animal. In operation, therefore it is seen that the frame is engaged with the neck of the animal so that the lever 13 and the lever 20 project above and below the frame, respectively, thereby pressing the injury-inflicting points into the body of the animal when pressure is exerted on either one or both of the levers.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. An animal poke including a frame, a lever movably associated with the lower end of the frame including a wire strand, an intermediate portion of which is formed to provide a parallelogram having feet depending therefrom, the opposite ends of said strand being convoluted about the frame and having the terminals thereof pointed to provide animal-engaging members to inflict injury on the animal when the lever is operated, and means to normally hold said animal-engaging members from penetration in the animal.

2. An animal poke comprising a plurality of adjustable sections, a U-shaped lever secured to and offset from one of the sections and having its arm divergent toward the section, loops attached to the lever for embracing the sides of the section for limiting the movement of the lever, and a second lever secured to the other section.

3. An animal poke including a frame of adjustable sections, a U-shaped lever having divergent arms which are coiled about the frame, the free ends thereof extend downwardly and form horizontal loops which receive the side arms of the section, after extending upwardly from said loops, one of the arms is coiled about the arms of the lever, while the other arm is entwined about the first, and both terminate in parallel pricking elements, and a lever secured to the other of said sections.

4. An animal poke including a frame of adjustable sections, levers movably connected to the sections, means for maintaining the levers in vertical position, one of said means comprising a wire strand having its ends coiled about the frame and engaging with a lever and its intermediate part bent to provide a guard for an adjacent pricking element, the other of said means having its ends coiled about the frame and intermediate part coiled about a pricking element secured to the adjacent lever.

In testimony whereof I affix my signature in presence of two witnesses.

OCTAVE CARON.

Witnesses:
E. W. CHRISTOPHER,
H. EMRICH.